(12) United States Patent
Osamura et al.

(10) Patent No.: US 12,354,626 B2
(45) Date of Patent: Jul. 8, 2025

(54) MAGNETIC RECORDING DEVICE WITH MAGNETIC ELEMENT CONFIGURATION DETAILS

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Ryo Osamura, Kawasaki Kanagawa (JP); Naoyuki Narita, Funabashi Chiba (JP); Masayuki Takagishi, Tokyo (JP); Yuji Nakagawa, Kawasaki Kanagawa (JP); Tomoyuki Maeda, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/425,544

(22) Filed: Jan. 29, 2024

(65) Prior Publication Data

US 2025/0037736 A1    Jan. 30, 2025

(30) Foreign Application Priority Data

Jul. 26, 2023    (JP) ................................. 2023-121861

(51) Int. Cl.
  *G11B 5/127*    (2006.01)
  *G11B 5/235*    (2006.01)
  (Continued)

(52) U.S. Cl.
  CPC ............ *G11B 5/1278* (2013.01); *G11B 5/235* (2013.01); *G11B 5/3116* (2013.01); *G11B 5/314* (2013.01);
  (Continued)

(58) Field of Classification Search
  None
  See application file for complete search history.

(56) References Cited

U.S. PATENT DOCUMENTS 8,446,691 B2 *   5/2013   Takagishi et al. ... G11B 5/1278
                                                  360/125.3
2022/0270641 A1   8/2022   Nakagawa et al.

FOREIGN PATENT DOCUMENTS

JP          2022-129730          9/2022

OTHER PUBLICATIONS

Shimoto, Masato et al., Effect of Effective Field Distribution on Recording Performance in Microwave Assisted Magnetic Recording:, IEEE Transactions on Magnetics 49, 2013, pp. 3636-3639 (4 pages).

* cited by examiner

*Primary Examiner* — Craig A. Renner
(74) *Attorney, Agent, or Firm* — Knobbe, Martens, Olson & Bear, LLP (57) ABSTRACT

According to one embodiment, a magnetic recording device includes a magnetic head and a magnetic recording medium. The magnetic head includes a first magnetic pole, a second magnetic pole, and a magnetic element provided between the first magnetic pole and the second magnetic pole. The magnetic element includes a first magnetic layer, and a second magnetic layer provided between the first magnetic layer and the second magnetic pole. The magnetic element includes a midpoint between the first magnetic layer and the second magnetic layer in a first direction from the first magnetic pole to the second magnetic pole.

20 Claims, 8 Drawing Sheets

(51) Int. Cl.
   *G11B 5/31*     (2006.01)
   *G11B 5/00*     (2006.01)
(52) U.S. Cl.
   CPC .... *G11B 5/3146* (2013.01); *G11B 2005/0005* (2013.01); *G11B 2005/0024* (2013.01)

MAGNETIC RECORDING DEVICE WITH MAGNETIC ELEMENT CONFIGURATION DETAILS

CROSS-REFERENCE TO RELATED APPLICATIONS

This application is based upon and claims the benefit of priority from Japanese Patent Application No. 2023-121861, filed on Jul. 26, 2023; the entire contents of which are incorporated herein by reference.

FIELD

Embodiments described herein relate generally to a magnetic recording device.

BACKGROUND

Information is recorded on a magnetic recording medium such as an HDD (Hard Disk Drive) using a magnetic head. In magnetic recording devices, it is desired to improve the recording density.

DETAILED DESCRIPTION

According to one embodiment, a magnetic recording device includes a magnetic head and a magnetic recording medium. The magnetic head includes a first magnetic pole, a second magnetic pole, and a magnetic element provided between the first magnetic pole and the second magnetic pole. The magnetic element includes a first magnetic layer, and a second magnetic layer provided between the first magnetic layer and the second magnetic pole. The magnetic element includes a midpoint between the first magnetic layer and the second magnetic layer in a first direction from the first magnetic pole to the second magnetic pole. A first ratio r1 and a second ratio r2 satisfy $-0.26 \times r1 + 0.60 \leq r2 \leq -0.26 \times r2 + 0.70$. The first ratio r1 is a ratio of a second distance L2 between the first magnetic pole and the midpoint in the first direction to a first distance L1 between the first magnetic pole and the second magnetic pole in the first direction. The second ratio r2 is a ratio of a dynamic coercive force Hc0 of the magnetic recording medium to an average anisotropic magnetic field Hk of the magnetic recording medium.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1:
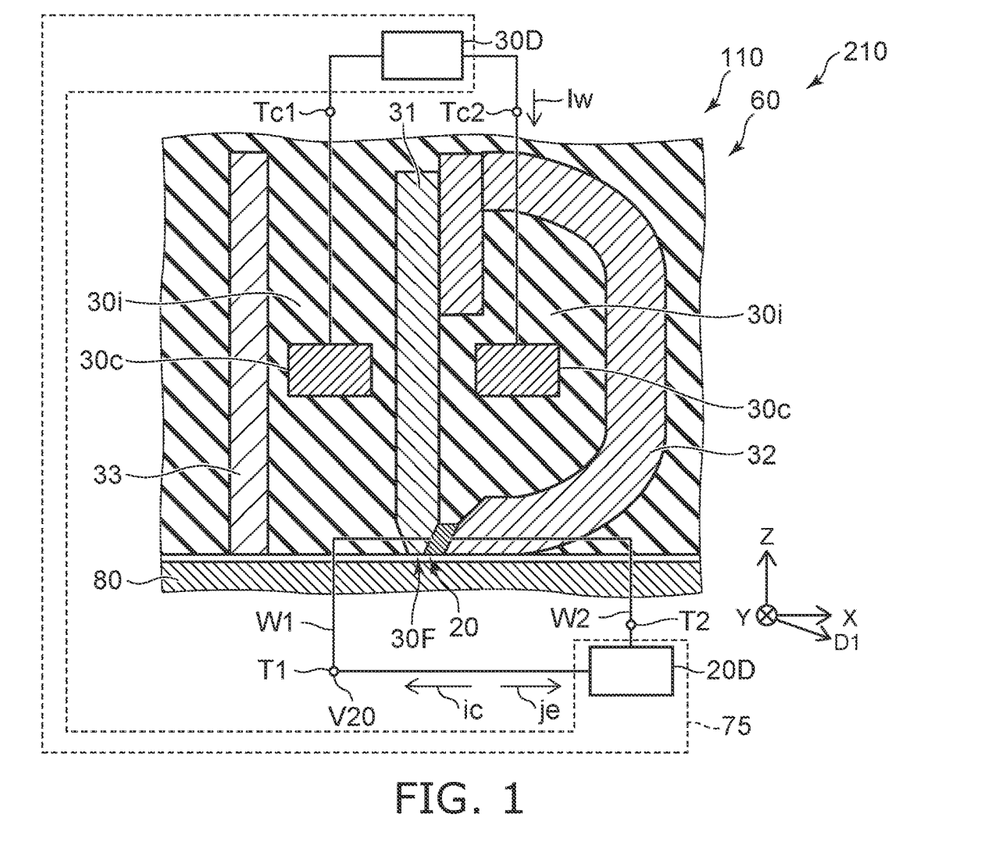
FIG. 1 is a schematic cross-sectional view illustrating a magnetic recording device according to a first embodiment.

FIG. 1 is a schematic cross-sectional view illustrating a magnetic recording device according to a first embodiment.

As shown in FIG. 1, a magnetic recording device 210 according to the embodiment includes a magnetic head 110 and a magnetic recording medium 80. The magnetic recording device 210 may include a controller 75. In the magnetic recording device 210, at least a recording operation is performed. In the recording operation, information is recorded on the magnetic recording medium 80 using the magnetic head 110.

The magnetic head 110 includes a recording section 60. As described later, the magnetic head 110 may include a reproducing section. The recording section 60 includes a first magnetic pole 31, a second magnetic pole 32, and a magnetic element 20. The magnetic head 110 may include a coil 30c. The magnetic element 20 is provided between the first magnetic pole 31 and the second magnetic pole 32.

For example, the first magnetic pole 31 and the second magnetic pole 32 form a magnetic circuit. The first magnetic pole 31 is, for example, a major magnetic pole. The second magnetic pole 32 is, for example, a trailing shield. The first magnetic pole 31 may be a trailing shield, and the second magnetic pole 32 may be a major magnetic pole.

A direction from the magnetic recording medium 80 to the magnetic head 110 is defined as a Z-axis direction. One direction perpendicular to the Z-axis direction is defined as an X-axis direction. A direction perpendicular to the Z-axis direction and the X-axis direction is defined as a Y-axis direction. The Z-axis direction corresponds to, for example, the height direction. The X-axis direction corresponds to, for example, the down-track direction. The Y-axis direction corresponds to, for example, the cross-track direction. The magnetic recording medium 80 and the magnetic head 110 move relative to each other along the down-track direction. A recording magnetic field generated from the magnetic head 110 is applied to a desired position on the magnetic recording medium 80. The magnetization at the desired position of the magnetic recording medium 80 is controlled in a direction corresponding to the recording magnetic field. As a result, information is recorded on the magnetic recording medium 80.

A direction from the first magnetic pole 31 to the second magnetic pole 32 is defined as a first direction D1. The first direction D1 may be substantially along the X-axis direction. In the embodiment, the first direction D1 may be inclined with respect to the X-axis direction. An angle of the inclination may be, for example, not less than 0 degrees and not more than 40 degrees.

In this example, an apart of the coil 30c is provided between the first magnetic pole 31 and the second magnetic pole 32. In this example, a shield 33 is provided. The first magnetic pole 31 is located between the shield 33 and the second magnetic pole 32 in the X-axis direction. Another part of the coil 30c is provided between the shield 33 and the first magnetic pole 31. An insulating section 30i is provided between these multiple elements. The shield 33 is, for example, a leading shield. The magnetic head 110 may include side shields (not shown).

As shown in FIG. 1, a recording current Iw is supplied from the recording circuit 30D to the coil 30c. For example, a first coil terminal Tc1 and a second coil terminal Tc2 are provided on the coil 30c. The recording current Iw is supplied to the coil 30c via these coil terminals. A recording magnetic field corresponding to the recording current Iw is applied to the magnetic recording medium 80 from the first magnetic pole 31.

As shown in FIG. 1, the first magnetic pole 31 includes a medium facing surface 30F The medium facing surface 30F is, for example, an ABS (Air Bearing Surface). The medium facing surface 30F faces the magnetic recording medium 80, for example. For example, the medium facing surface 30F is along the X-Y plane.

As shown in FIG. 1, an element circuit 20D is electrically connected to the magnetic element 20. In this example, the magnetic element 20 is electrically connected to the first magnetic pole 31 and the second magnetic pole 32. The magnetic head 110 is provided with a first terminal T1 and a second terminal T2. The first terminal T1 is electrically connected to one end of the magnetic element 20 via the first wiring W1 and the first magnetic pole 31. The second terminal T2 is electrically connected to the other end of the magnetic element 20 via the second wiring W2 and the second magnetic pole 32. For example, an element current ic is supplied to the magnetic element 20 from the element circuit 20D.

As shown in FIG. 1, the element current ic has an orientation from the first magnetic pole 31 to the second magnetic pole 32. As shown in FIG. 1, the electron flow je accompanying the element current ic has an orientation from the second magnetic pole 32 to the first magnetic pole 31. The element current ic includes a direct current component. The element current ic may be, for example, a direct current.

For example, when the element current ic equal to or higher than a threshold value flows through the magnetic element 20, oscillation occurs in the magnetic layer included in the magnetic element 20. The magnetic element 20 functions as, for example, an STO (Spin-Torque Oscillator). Along with the oscillation, an alternating magnetic field (for example, a high frequency magnetic field) is generated from the magnetic element 20. The alternating magnetic field generated by the magnetic element 20 is applied to the magnetic recording medium 80 to assist recording on the magnetic recording medium 80. For example, MAMR (Microwave Assisted Magnetic Recording) can be implemented.

For example, the electrical resistance of the magnetic element 20 oscillates in response to the alternating magnetic field from the magnetic element 20. Oscillations in electrical resistance correspond to the alternating magnetic fields.

The oscillation of magnetization occurs in the first magnetic layer 21 and the second magnetic layer 22. These magnetic layers are, for example, oscillation layers.

The recording circuit 30D and the element circuit 20D are included in the controller 75. The controller 75 is electrically connected to the magnetic element 20 and the coil 30c. The controller 75 is electrically connected to the first terminal T1, the second terminal T2, and the coil 30c. The controller 75 is configured to supply the recording current Iw to the coil 30c and the element current ic to the magnetic element 20.

For example, the controller 75 (element circuit 20D) applies an element voltage V20 corresponding to the element current ic between the first terminal T1 and the second terminal T2. Practically, the element current ic may be controlled by controlling the element voltage V20. In the recording operation, the controller 75 supplies the recording current Iw to the coil 30c while applying the device voltage V20 between the first terminal T1 and the second terminal T2.

An example of the magnetic head 110 will be described below.

Figure 2:
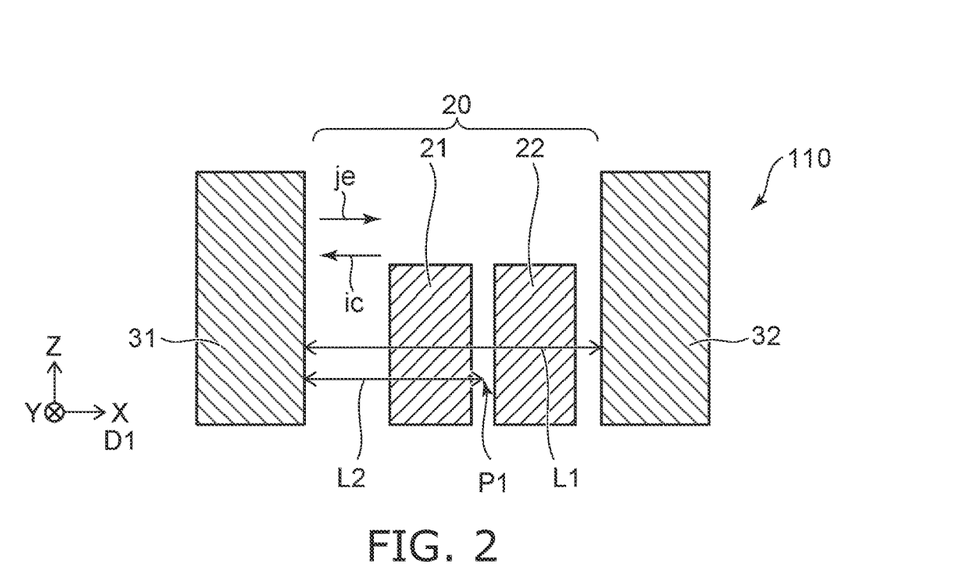
FIG. 2 is a schematic cross-sectional view illustrating a part of the magnetic recording device according to the first embodiment.

FIG. 2 is a schematic cross-sectional view illustrating a part of the magnetic recording device according to the first embodiment.

As shown in FIG. 2, the magnetic element 20 includes a first magnetic layer 21 and a second magnetic layer 22. The second magnetic layer 22 is provided between the first magnetic layer 21 and the second magnetic pole 32. As described below, the magnetic element 20 may further include other magnetic layers.

The magnetic element 20 includes a midpoint P1. The midpoint P1 is the midpoint between the first magnetic layer 21 and the second magnetic layer 22 in the first direction D1 from the first magnetic pole 31 to the second magnetic pole 32.

A distance between the first magnetic pole 31 and the second magnetic pole 32 in the first direction D1 is defined as a first distance L1. A distance between the first magnetic pole 31 and the midpoint P1 in the first direction D1 is defined as a second distance L2. A first ratio r1 is a ratio (L2/L1) of the second distance L2 to the first distance L1. The first ratio r1 is greater than 0 and less than 1.

A second ratio r2 is a ratio (Hc0/Hk) of a dynamic coercive force Hc0 of the magnetic recording medium 80 to an average anisotropic magnetic field Hk of the magnetic recording medium 80. As described later, the magnetic recording medium 80 includes a magnetic recording layer 81. The dynamic coercive force Hc0 of the magnetic recording medium 80 may be the dynamic coercive force Hc0 of the magnetic recording layer 81. The average anisotropic magnetic field Hk of the magnetic recording medium 80 may be the average anisotropic magnetic field Hk of the magnetic recording layer 81. The dynamic coercive force Hc0 is, for example, a coercive force evaluated in a time period of not less than 1 ns and not more than 10 ns. The time being not less than 1 ns and not more than 10 ns corresponds to, for example, the time from a start to an end of magnetization reversal in the magnetic recording device 210.

In the embodiment, the first ratio r1 and the second ratio r2 satisfy the first formula:

$$-0.26 \times r1 + 0.60 \leq r2 \leq -0.26 \times r2 + 0.70 \quad (1).$$

For example, when the first formula above is satisfied, a high SNR can be obtained. For example, recording with high SNR can be performed at high recording density. A low error rate can be maintained even at high recording densities. According to the embodiment, it is possible to provide a magnetic recording device that can improve recording density.

Examples of simulation results regarding the characteristics of the magnetic recording device will be described below. In the examples below, the first distance L1 is fixed and the second distance L2 is changed. In the examples below, the first distance L1 is 27 nm. The magnetization volume of the first magnetic layer 21 is 16 nmT. The magnetization volume of the second magnetic layer 22 is 16 nmT. The dynamic coercive force Hc0 is changed while keeping the average anisotropic magnetic field Hk constant. The average anisotropic magnetic field Hk is 19400 kOe.

Figure 3:
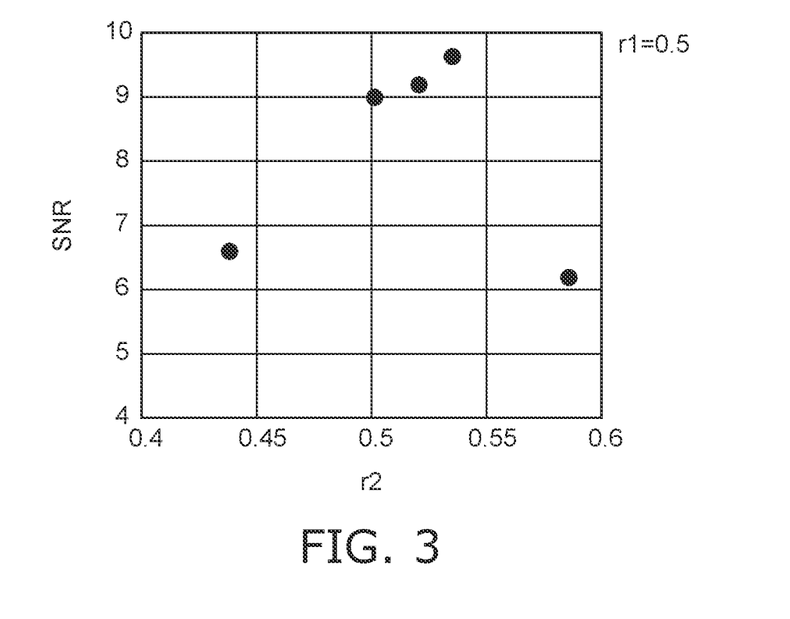
FIG. 3 is a graph illustrating the characteristics of the magnetic recording device.
Figure 4:
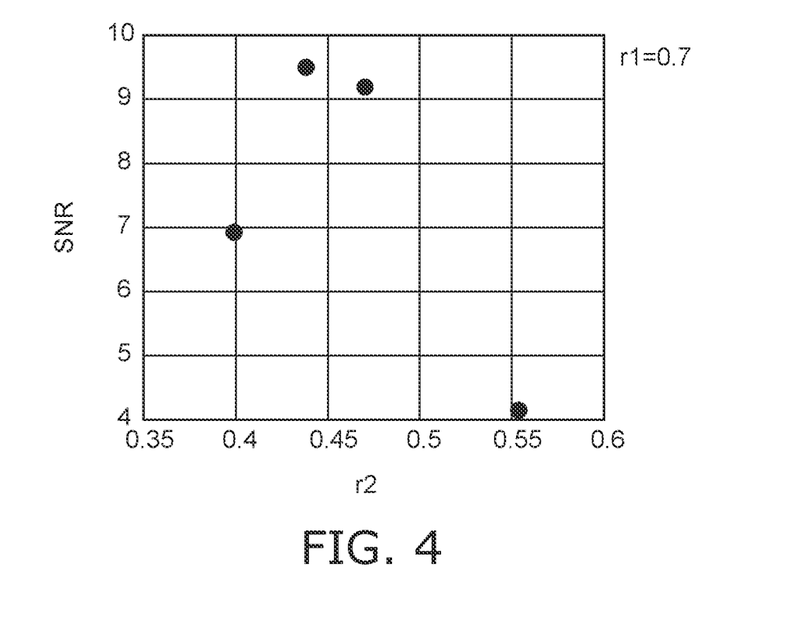
FIG. 4 is a graph illustrating the characteristics of the magnetic recording device.

FIGS. 3 and 4 are graphs illustrating the characteristics of magnetic recording devices.

In these figures, the horizontal axis is the second ratio r2. The vertical axis is SNR. The SNR is defined as $20 \log_{10}$ (S/N) using a reproducing signal output S and a noise output N. In FIG. 3, the first ratio r1 is 0.5. In FIG. 4, the first ratio r1 is 0.7.

As shown in FIG. 3, in the case where the first ratio r1 is 0.5, the SNR is high when the second ratio r2 is about 0.54. IN the case where the second ratio r2 is less than 0.54, the SNR increases as the second ratio r2 increases. In the case where the second ratio r2 is higher than 0.54, the SNR decreases as the second ratio r2 increases.

As shown in FIG. 4, in the case where the first ratio r1 is 0.7, the SNR is high when the second ratio r2 is about 0.44. In the case where the second ratio r2 is less than 0.44, the SNR increases as the second ratio r2 increases. In the case where the second ratio r2 is higher than 0.44, the SNR decreases as the second ratio r2 increases.

Thus, the second ratio r2 that provides a high SNR changes depending on the value of the first ratio r1. When the SNR is 9.0 or more, recording at a practically high density is possible.

Figure 5:
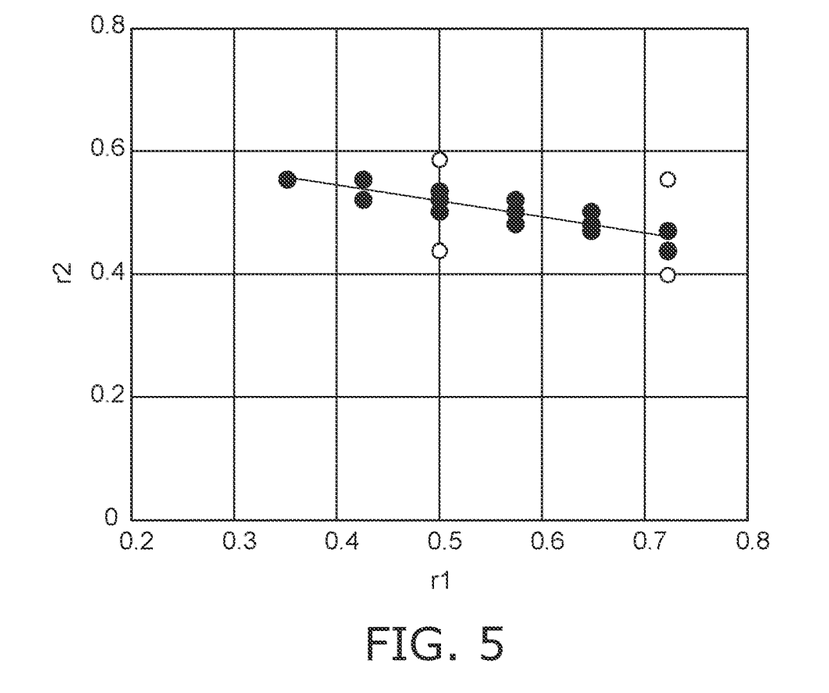
FIG. 5 is a graph illustrating the characteristics of the magnetic recording device.

FIG. 5 is a graph illustrating the characteristics of the magnetic recording device.

In FIG. 5, the horizontal axis is the first ratio r1. The vertical axis is the second ratio r2. In FIG. 5, closed circles indicate that SNR of 0.75 or more can be obtained. Open circles indicate SNR is less than 0.75. As shown in FIG. 5, the conditions for obtaining SNR of 9.0 or higher (closed circles) is expressed as are following second formula:

$$r2 = -0.2612 \times r1 + 0.6493 \quad (2).$$

In the case where the second formula is satisfied, a high SNR can be obtained. Considering an error of 0.5 existing in the relationship of the second formula, the above-mentioned relationship of the first formula is obtained. Practically, a high SNR can be obtained if the first formula is satisfied.

For example, the recording magnetic field generated from the first magnetic pole 31 is applied to the magnetic recording medium 80 and acts on the magnetization of the magnetic recording medium 80. On the other hand, the alternating magnetic field generated from the magnetic element 20 is applied to the magnetic recording medium 80. Considering the dynamic coercive force Hc0 of the magnetic recording medium 80, it is thought that there is an appropriate relationship between the position where the recording magnetic field substantially influences the magnetization of the magnetic recording medium 80 and the position of the midpoint P1 of the two oscillation layers. in the case where the first formula above is satisfied, it is considered that the alternating magnetic field generated from the magnetic element 20 is appropriately applied to the position where the recording magnetic field substantially affects the magnetization of the magnetic recording medium 80. As a result, it is considered that a high SNR can be obtained when the first formula is satisfied.

In the embodiment, the first ratio r1 is preferably, for example, not less than 0.35 and not more the 0.7. In this case, it is easy to obtain a stable alternating magnetic field with high efficiency.

In the embodiment, the second ratio r2 is preferably, for example, not less than 0.45 and not more than 0.56. In this case, it is easy to obtain a magnetic recording medium 80 with stable characteristics. It is easy to obtain stable characteristics.

In the embodiment, the average anisotropic magnetic field Hk is preferably not less than 17,300 Oe and not more than 21,200 Oe. The dynamic coercive force Hc0 is preferably not less than 7500 Oe and not more than 11000 Oe. A magnetic recording medium 80 with stable characteristics is obtained.

In the embodiment, the first distance L1 is preferably, for example, not less than 15 nm and not more than 50. A high-strength alternating magnetic field is stably obtained.

In the embodiment, a product of a first saturation magnetization of the first magnetic layer 21 and a thickness of the first magnetic layer 21 in the first direction D1 (first magnetic layer thickness t1 to be described later) is not less than 9 nmT and not more than 19 nmT. A product of a second saturation magnetization of the second magnetic layer 22 and a thickness of the second magnetic layer 22 in the first direction D1 (second magnetic layer thickness t2 described later) is preferably not less than 9 nmT and not more than 19 nmT. It becomes easy to obtain stable oscillation. A stable alternating magnetic field is obtained.

Figure 6:
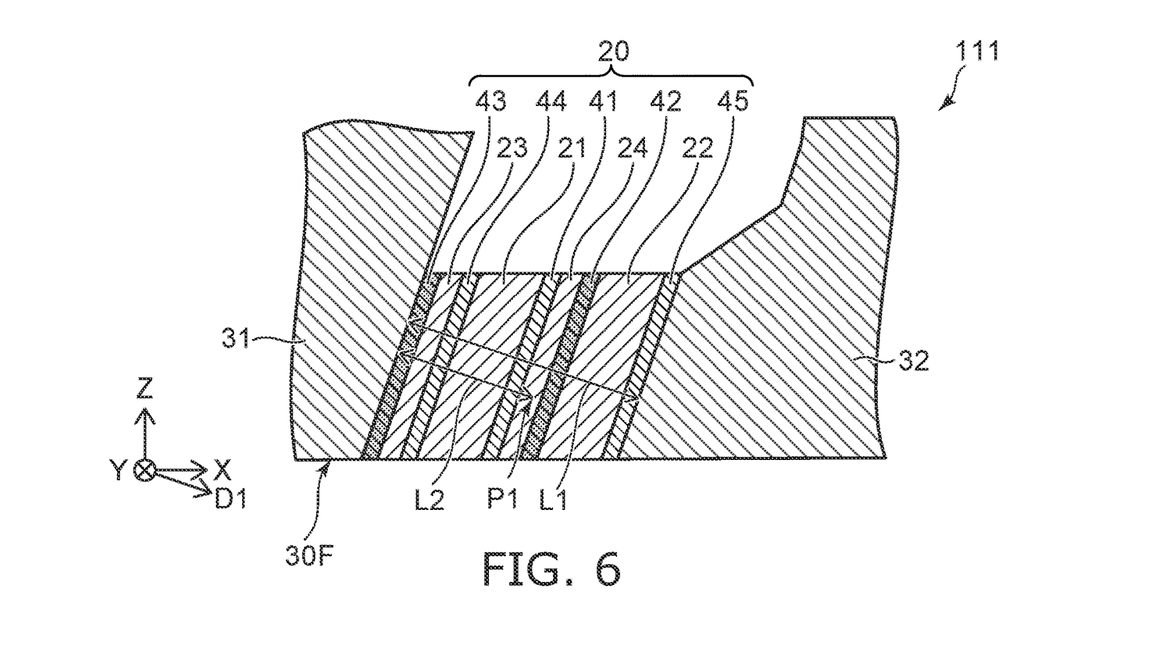
FIG. 6 is a schematic cross-sectional view illustrating a part of the magnetic recording device according to the first embodiment.
Figure 7:
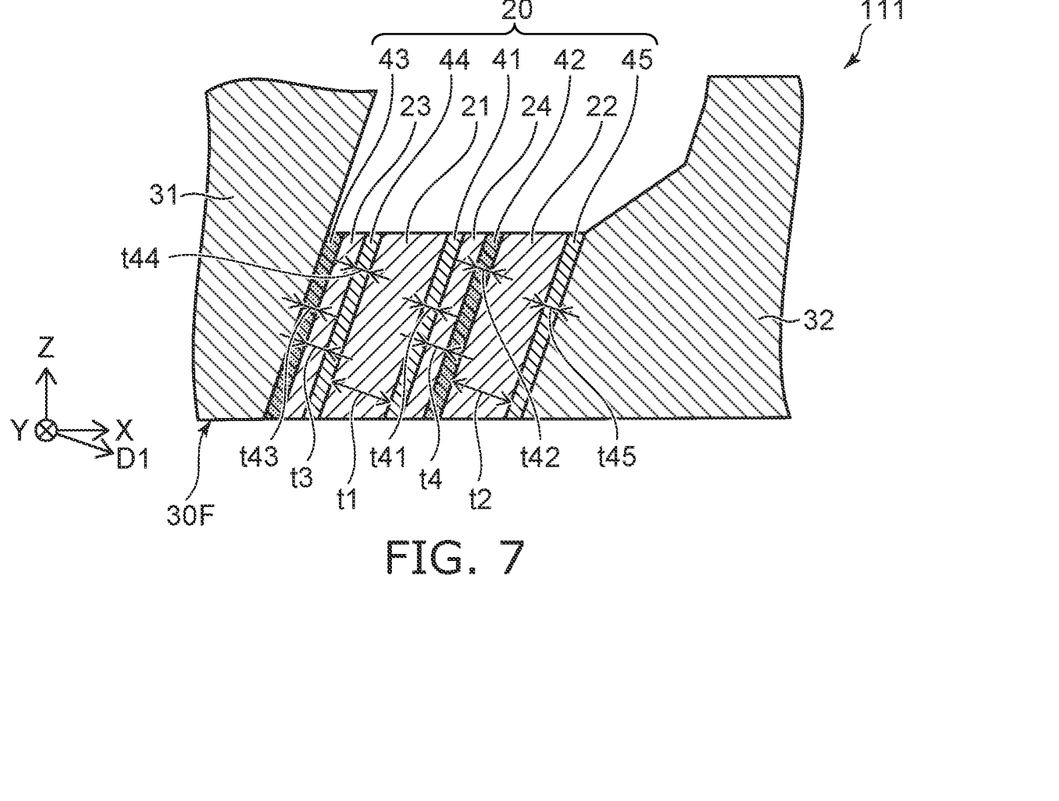
FIG. 7 is a schematic cross-sectional view illustrating a part of the magnetic recording device according to the first embodiment.

FIGS. 6 and 7 are schematic cross-sectional views illustrating a part of the magnetic recording device according to the first embodiment.

As shown in FIG. 6, in a magnetic head 111 included in the magnetic recording device 210 according to the embodiment, the magnetic element 20 includes a third magnetic layer 23 and a fourth magnetic layer 24. Except for this, the configuration of the magnetic head 111 may be the same as the configuration of the magnetic head 110.

In the magnetic head 111, the magnetic element 20 includes the first magnetic layer 21, the second magnetic layer 22, the third magnetic layer 23, and the fourth magnetic layer 24. As already explained, the second magnetic layer 22 is provided between the first magnetic layer 21 and the second magnetic pole 32. The third magnetic layer 23 is provided between the first magnetic pole 31 and the first magnetic layer 21. The fourth magnetic layer 24 is provided between the first magnetic layer 21 and the second magnetic layer 22.

As shown in FIG. 7, a thickness of the first magnetic layer 21 along the first direction D1 is defined as a first magnetic layer thickness t1. A thickness of the second magnetic layer 22 along the first direction D1 is defined as a second magnetic layer thickness t2. A thickness of the third magnetic layer 23 along the first direction D1 is defined as a third magnetic layer thickness t3. A thickness of the fourth magnetic layer 24 along the first direction D1 is referred to as a fourth magnetic layer thickness t4.

In the embodiment, the first magnetic layer thickness t1 is thicker than the third magnetic layer thickness t3. The second magnetic layer thickness t2 is thicker than the fourth magnetic layer thickness t4. The first magnetic layer thickness t1 is thicker than the fourth magnetic layer thickness t4. The second magnetic layer thickness t2 is thicker than the third magnetic layer thickness t3.

For example, the first magnetic layer 21 and the second magnetic layer 22 function as oscillation layers. The third magnetic layer 23 and the fourth magnetic layer 24 function as spin injection layers.

The magnetic element 20 may include, for example, a first nonmagnetic layer 41, a second nonmagnetic layer 42, a third nonmagnetic layer 43, a fourth nonmagnetic layer 44, and a fifth nonmagnetic layer 45. The first nonmagnetic layer 41 is provided between the first magnetic layer 21 and the fourth magnetic layer 24. The second nonmagnetic layer 42 is provided between the fourth magnetic layer 24 and the second magnetic layer 22. The third nonmagnetic layer 43 is provided between the first magnetic pole 31 and the third magnetic layer 23. The fourth nonmagnetic layer 44 is provided between the third magnetic layer 23 and the first magnetic layer 21. The fifth nonmagnetic layer 45 is provided between the second magnetic layer 22 and the second magnetic pole 32.

In the magnetic head 111, the first nonmagnetic layer 41 is in contact with the first magnetic layer 21 and the fourth magnetic layer 24. The second nonmagnetic layer 42 is in contact with the fourth magnetic layer 24 and the second magnetic layer 22. The third nonmagnetic layer 43 is in contact with the first magnetic pole 31 and the third magnetic layer 23. The fourth nonmagnetic layer 44 is in contact with the third magnetic layer 23 and the first magnetic layer 21. The fifth nonmagnetic layer 45 is in contact with the second magnetic layer 22 and the second magnetic pole 32.

Also in the magnetic head 111, the magnetic element 20 includes the midpoint P1 (see FIG. 6). In the magnetic head 111 as well, the relationship of the first formula is satisfied. Thereby, a high SNR is obtained.

In the magnetic head 111, the first magnetic layer thickness t1 is preferably, for example, not less than 5 nm and not more than 15 nm. The second magnetic layer thickness t2 is preferably, for example, not less than 5 nm and not more than 15 nm. The third magnetic layer thickness t3 is preferably, for example, not less than 1 nm and not more than 5 nm. The fourth magnetic layer thickness t4 is preferably, for example, not less than 1 nm and not more than 5 nm. it is easy to obtain a stable alternating magnetic field.

In the magnetic head 111, the product of the first saturation magnetization of the first magnetic layer 21 and the first magnetic layer thickness t1 is preferably not less than 9 nmT and not more than 19 nmT. The product of the second saturation magnetization of the second magnetic layer 22 and the second magnetic layer thickness t2 is preferably not less than 9 nmT and not more than 19 nmT. A product of a third saturation magnetization of the third magnetic layer 23 and the third magnetic layer thickness t3 is preferably not less than 2 nmT and not more than 10 nmT. A product of a fourth saturation magnetization of the fourth magnetic layer 24 and the fourth magnetic layer thickness t4 is preferably not less than 2 nmT and not more than 10 nmT. For example, a stable alternating magnetic field is obtained with high efficiency.

In the magnetic head 110 illustrated in FIG. 2, a nonmagnetic layer corresponding to at least one of the first nonmagnetic layer 41 or the second nonmagnetic layer 42 may be provided between the first magnetic layer 21 and the second magnetic layer 22. In the magnetic head 110, a nonmagnetic layer corresponding to at least one of the third nonmagnetic layer 43 or the fourth nonmagnetic layer 44 may be provided between the first magnetic pole 31 and the second magnetic layer 22. In the magnetic head 110, a nonmagnetic layer corresponding to the fifth nonmagnetic layer 45 may be provided between the second magnetic layer 22 and the second magnetic pole 32.

In the magnetic head 111, the first nonmagnetic layer 41 includes at least one selected from the group consisting of Cu, Au, Cr, Al, V, and Ag. The second nonmagnetic layer 42 includes at least one selected from the group consisting of Cu, Au, Cr, Al, V, and Ag. The third nonmagnetic layer 43 includes at least one selected from the group consisting of Cu, Au, Cr, Al, V, and Ag. The fourth nonmagnetic layer 44 includes at least one selected from the group consisting of Ru, Ir, Ta, Rh, Pd, Pt, and W. The fifth nonmagnetic layer 45 includes at least one selected from the group consisting of Ru, Ir, Ta, Rh, Pd, Pt, and W. Thereby, it becomes easy to obtain a stable alternating magnetic field.

As shown in FIG. 7, the first nonmagnetic layer 41 has a first nonmagnetic layer thickness t41 along the first direction D1. The first nonmagnetic layer thickness t41 is preferably, for example, not less than 0.5 nm and not more than 6 nm. The second nonmagnetic layer thickness t42 is preferably, for example, not less than 0.5 nm and not more than 6 nm. The third nonmagnetic layer thickness t43 is preferably, for example, not less than 0.5 nm and not more than 6 nm. The fourth nonmagnetic layer thickness t44 is preferably, for example, not less than 0.5 nm and not more than 6 nm. The fifth nonmagnetic layer thickness t45 is preferably, for example, not less than 0.5 nm and not more than 6 nm. It becomes easy to obtain a stable alternating magnetic field.

As shown in FIG. 6, in the magnetic head 111, the first direction D1 is inclined with respect to the X-axis direction. As shown in FIG. 6, the magnetic head 110 includes a medium facing surface 30F. The angle between the first direction D1 and the medium facing surface 30F may be not less than 0 degrees and not more than 40 degrees.

Figure 8:
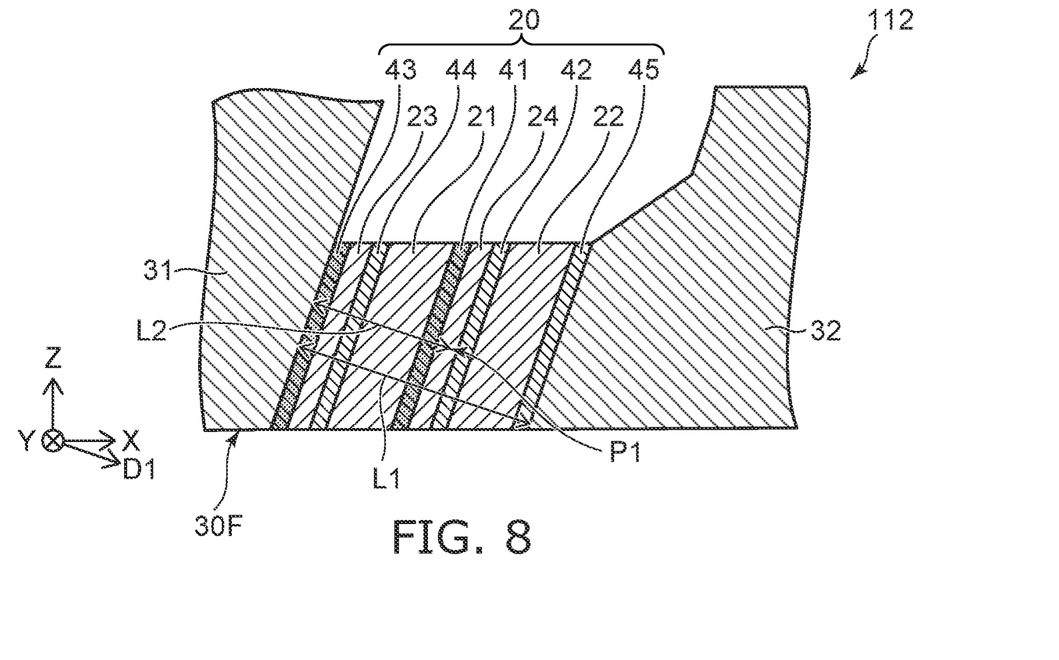
FIG. 8 is a schematic cross-sectional view illustrating a part of the magnetic recording device according to the first embodiment.

FIG. 8 is a schematic cross-sectional view illustrating a part of the magnetic recording device according to the first embodiment.

As shown in FIG. 8, in a magnetic head 112 included in the magnetic recording device 210 according to the embodiment, the material of the nonmagnetic layers included in the magnetic element 20 is different from the material of the nonmagnetic layers included in the magnetic head 111. Except for this, the configuration of the magnetic head 112 may be the same as the configuration of the magnetic head 111.

In the magnetic head 112, the first nonmagnetic layer 41 includes at least one selected from the group consisting of Ru, Ir, Ta, Rh, Pd, Pt, and W. The second nonmagnetic layer 42 includes at least one selected from the group consisting of Cu, Au, Cr, Al, V, and Ag. The third nonmagnetic layer 43 includes at least one selected from the group consisting of Cu, Au, Cr, Al, V, and Ag. The fourth nonmagnetic layer 44 includes at least one selected from the group consisting of Cu, Au, Cr, Al, V, and Ag. The fifth nonmagnetic layer 45 includes at least one selected from the group consisting of Ru, Ir, Ta, Rh, Pd, Pt, and W. Thereby, it is easy to obtain a stable alternating magnetic field. In the magnetic head 112 as well, the above relationship of the first formula is satisfied. High SNR can be obtained.

Figure 9:
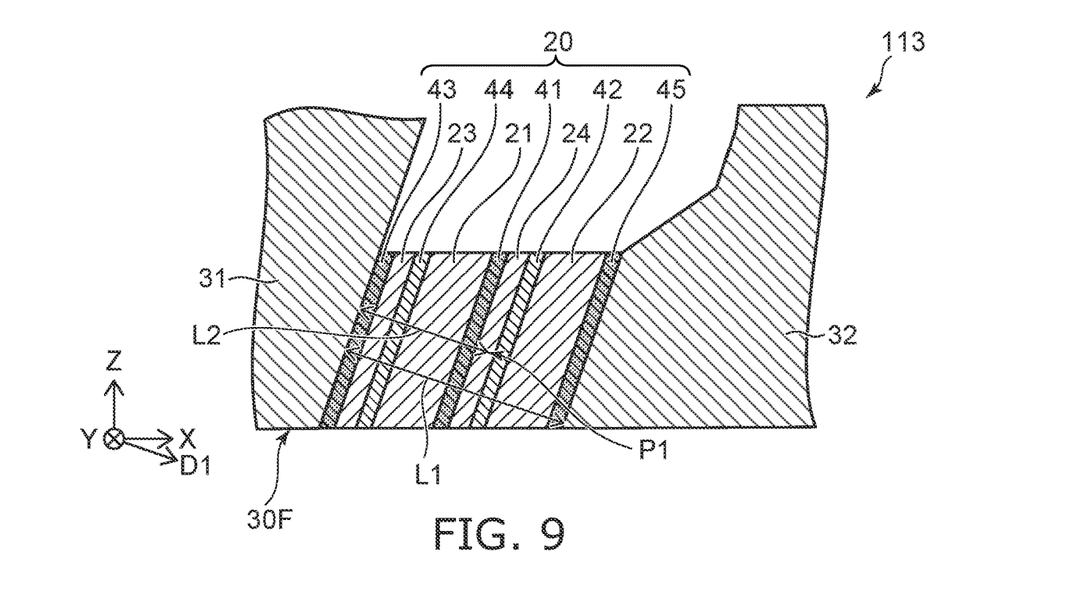
FIG. 9 is a schematic cross-sectional view illustrating a part of the magnetic recording device according to the first embodiment.

FIG. 9 is a schematic cross-sectional view illustrating a part of the magnetic recording device according to the first embodiment.

As shown in FIG. 9, in a magnetic head 113 included in the magnetic recording device 210 according to the embodiment, the material of the nonmagnetic layers included in the magnetic element 20 is different from the material of the nonmagnetic layers included in the magnetic head 111. Except for this, the configuration of the magnetic head 113 may be the same as the configuration of the magnetic head 111.

In the magnetic head 113, the first nonmagnetic layer 41 includes at least one selected from the group consisting of Ru, Ir, Ta, Rh, Pd, Pt, and W. The second nonmagnetic layer 42 includes at least one selected from the group consisting of Cu, Au, Cr, Al, V, and Ag. The third nonmagnetic layer 43 includes at least one selected from the group consisting of Ru, Ir, Ta, Rh, Pd, Pt, and W. The fourth nonmagnetic layer 44 includes at least one selected from the group consisting of Cu, Au, Cr, Al, V, and Ag. The fifth nonmagnetic layer 45 includes at least one selected from the group consisting of Ru, Ir, Ta, Rh, Pd, Pt, and W. Thereby, it is easy to obtain a stable alternating magnetic field. In the magnetic head 113 as well, the relationship of the above first equation is satisfied. High SNR can be obtained.

Examples of other configurations regarding the magnetic recording device according to the embodiment will be described below.

Figure 10:
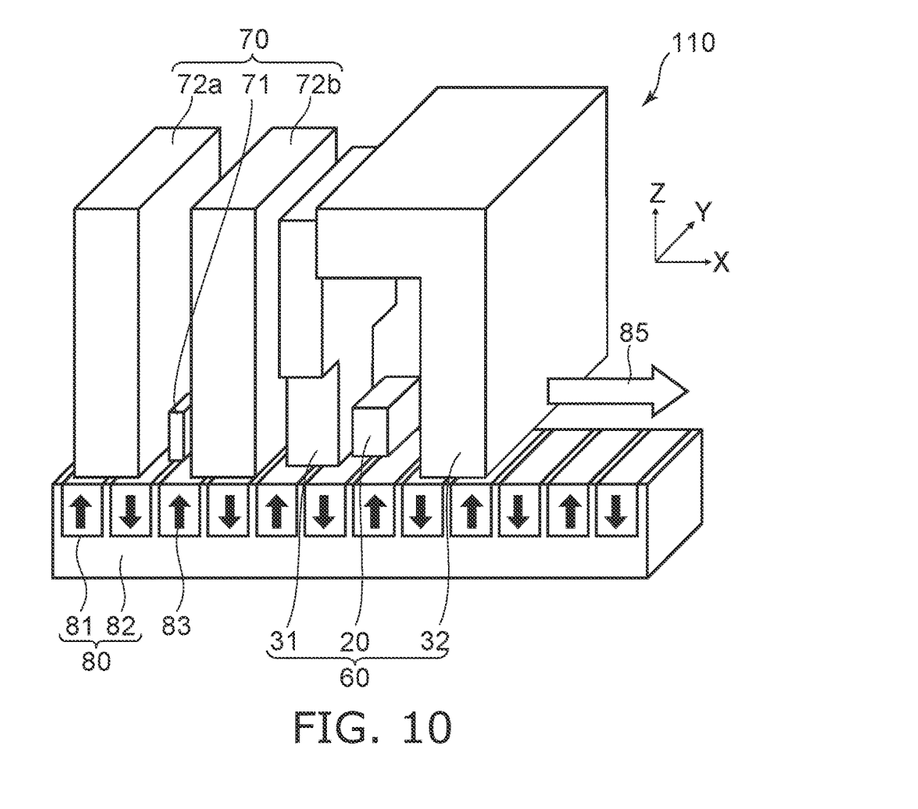
FIG. 10 is a schematic perspective view illustrating the magnetic recording device according to an embodiment.

FIG. 10 is a schematic perspective view illustrating the magnetic recording device according to an embodiment.

As shown in FIG. 10, the magnetic head (e.g., the magnetic head 110) according to the embodiment is used together with the magnetic recording medium 80. In this example, the magnetic head 110 includes the recording section 60 and a reproducing section 70. Information is recorded on the magnetic recording medium 80 by the recording section 60 of the magnetic head 110. The reproducing section 70 reproduces information recorded on the magnetic recording medium 80.

The magnetic recording medium 80 includes, for example, a medium substrate 82 and the magnetic recording layer 81 provided on the medium substrate 82. Magnetization 83 of the magnetic recording layer 81 is controlled by the recording section 60.

In the embodiment, the thickness of the magnetic recording layer 81 may be, for example, not less than 5 nm and not more than 50 nm. The magnetic recording layer 81 with stable characteristics can be easily obtained. The magnetic recording layer 81 may be, for example, a perpendicular magnetization film.

The reproducing section 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is configured to output a signal according to the magnetization 83 of the magnetic recording layer 81.

As shown in FIG. 10, the magnetic recording medium 80 moves relative to the magnetic head 110 in a medium movement direction 85. The magnetic head 110 controls information corresponding to the magnetization 83 of the magnetic recording layer 81 at an arbitrary position. The magnetic head 110 reproduces information corresponding to the magnetization 83 of the magnetic recording layer 81 at an arbitrary position.

Figure 11:
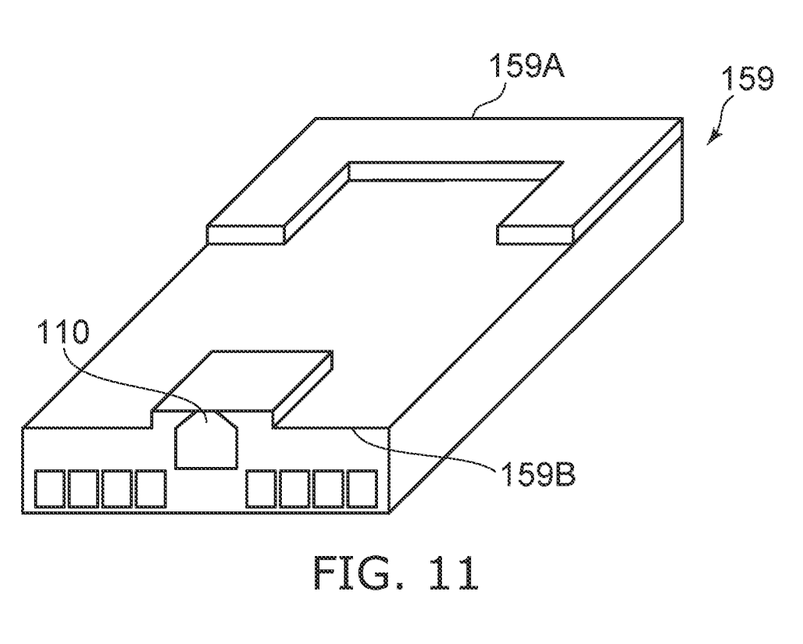
FIG. 11 is a schematic perspective view illustrating a part of the magnetic recording device according to the embodiment.

FIG. 11 is a schematic perspective view illustrating a part of the magnetic recording device according to the embodiment.

FIG. 11 illustrates a head slider.

The magnetic head 110 is provided on the head slider 159. The head slider 159 includes, for example, $Al_2O_3$/TiC or the like. The head slider 159 moves relative to the magnetic recording medium while floating or in contact with the magnetic recording medium.

The head slider 159 includes, for example, an air inflow side 159A and an air outflow side 159B. The magnetic head 110 is arranged on the side surface of the air outflow side 159B of the head slider 159 or the like. As a result, the magnetic head 110 moves relative to the magnetic recording medium while flying above or in contact with the magnetic recording medium.

Figure 12:
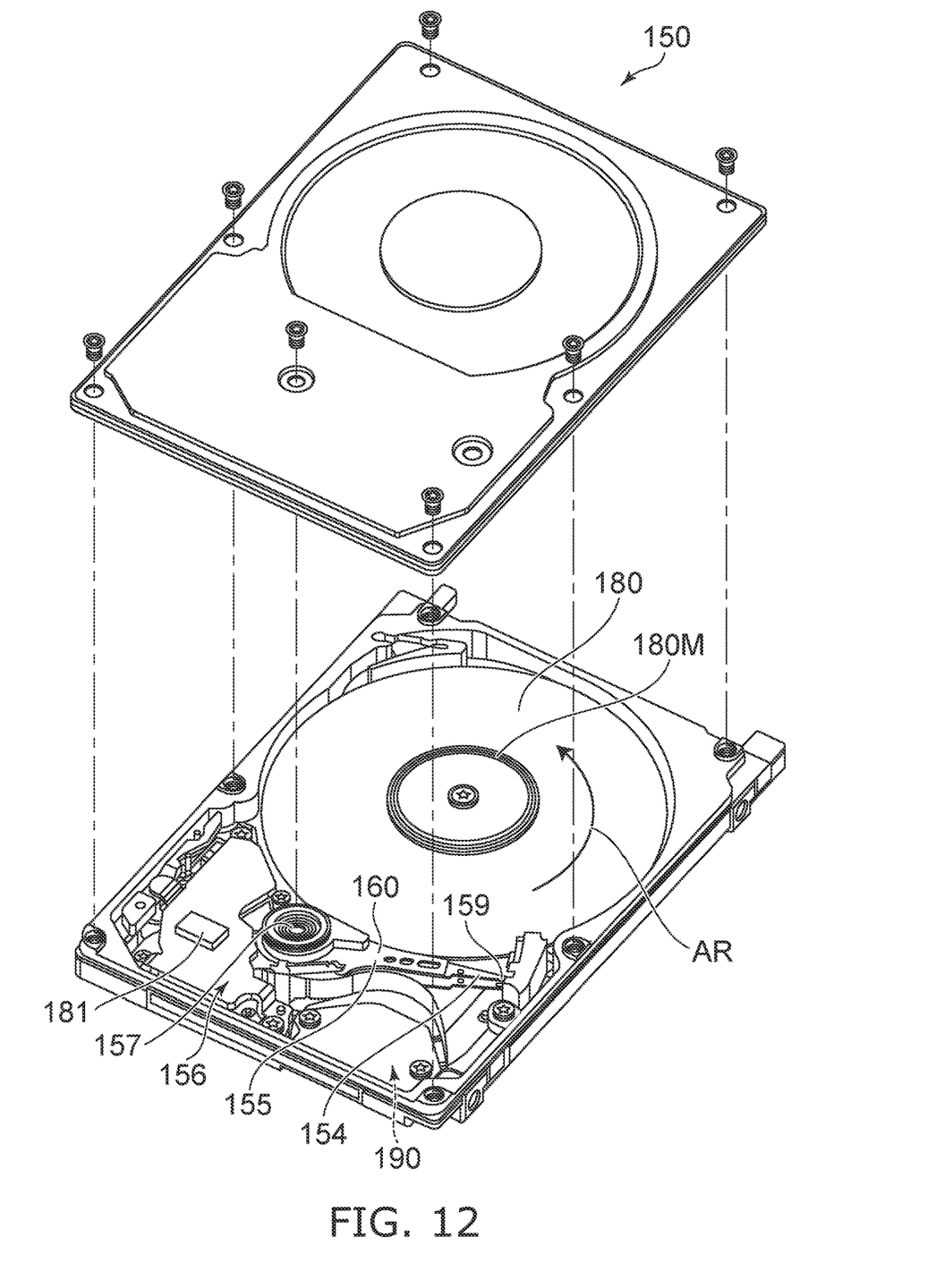
FIG. 12 is a schematic perspective view illustrating the magnetic recording device according to the embodiment.

FIG. 12 is a schematic perspective view illustrating the magnetic recording device according to the embodiment.

Figure 13A:
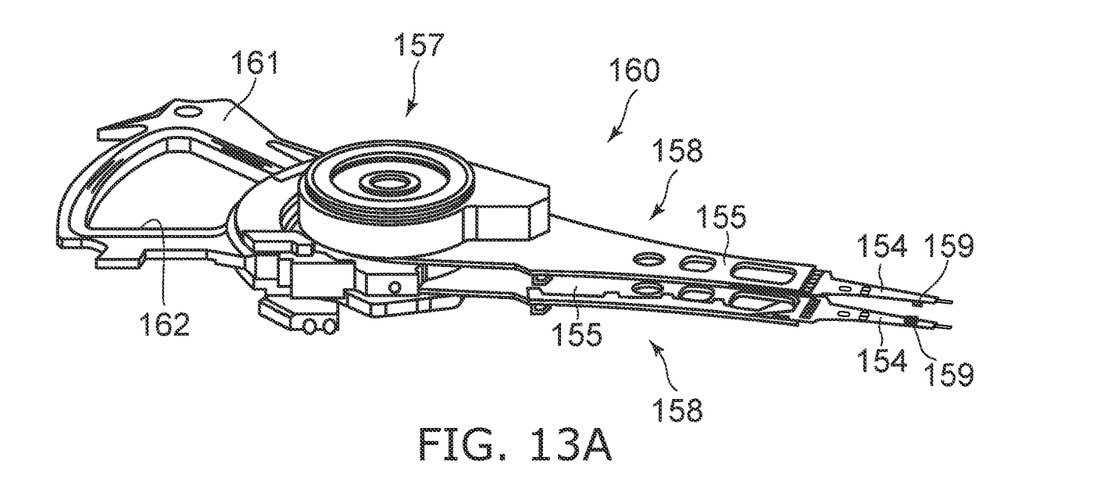
FIGS. 13A and 13B are schematic perspective views illustrating a part of the magnetic recording device according to the embodiment.
Figure 13B:
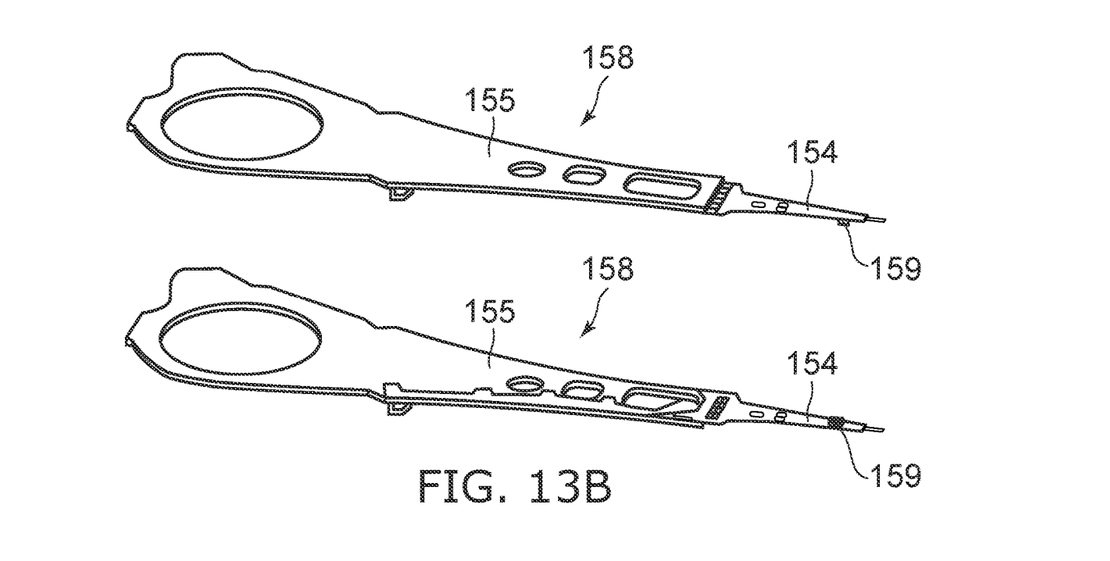

FIGS. 13A and 13B are schematic perspective views illustrating a part of the magnetic recording device according to the embodiment.

The magnetic recording device may be a magnetic recording/reproducing device. As shown in FIG. 12, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 13A is an enlarged perspective view of the head stack assembly 160, illustrating the configuration of a part of the magnetic recording device.

FIG. 13B is a perspective view illustrating the magnetic head assembly (head gimbal assembly: HGA) 158 that forms part of the head stack assembly 160.

As shown in FIG. 13A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 13B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following Technical proposals.

(Technical Proposal 1)
A magnetic recording device, comprising:
a magnetic head, including
a first magnetic pole,
a second magnetic pole, and
a magnetic element provided between the first magnetic pole and the second magnetic pole, the magnetic element including a first magnetic layer, and a second magnetic layer provided between the first magnetic layer and the second magnetic pole; and
a magnetic recording medium,
the magnetic element including a midpoint between the first magnetic layer and the second magnetic layer in a first direction from the first magnetic pole to the second magnetic pole,
a first ratio r1 and a second ratio r2 satisfying $$-0.26 \times r1 + 0.60 \leq r2 \leq -0.26 \times r2 + 0.70,$$

the first ratio r1 being a ratio of a second distance L2 between the first magnetic pole and the midpoint in the first direction to a first distance L1 between the first magnetic pole and the second magnetic pole in the first direction, and
the second ratio r2 being a ratio of a dynamic coercive force Hc0 of the magnetic recording medium to an average anisotropic magnetic field Hk of the magnetic recording medium.

(Technical Proposal 2)
The magnetic recording device according to Technical proposal 1, wherein
the magnetic element includes
a third magnetic layer provided between the first magnetic pole and the first magnetic layer, and
a fourth magnetic layer provided between the first magnetic layer and the second magnetic layer,
a first magnetic layer thickness of the first magnetic layer along the first direction is thicker than a third magnetic layer thickness of the third magnetic layer along the first direction, and
a second magnetic layer thickness of the second magnetic layer along the first direction is thicker than a fourth magnetic layer thickness of the fourth magnetic layer along the first direction.

(Technical Proposal 3)
The magnetic recording device according to Technical proposal 2, wherein
the first magnetic layer thickness is thicker than the fourth magnetic layer thickness, and
the second magnetic layer thickness is thicker than the third magnetic layer thickness.

(Technical Proposal 4)
The magnetic recording device according to Technical proposal 2, wherein
the magnetic element includes
a first nonmagnetic layer provided between the first magnetic layer and the fourth magnetic layer,
a second nonmagnetic layer provided between the fourth magnetic layer and the second magnetic layer,
a third nonmagnetic layer provided between the first magnetic pole and the third magnetic layer,
a fourth nonmagnetic layer provided between the third magnetic layer and the first magnetic layer, and
a fifth nonmagnetic layer provided between the second magnetic layer and the second magnetic pole.

(Technical Proposal 5)
The magnetic recording device according to Technical proposal 4, wherein
the first nonmagnetic layer is in contact with the first magnetic layer and the fourth magnetic layer,
the second nonmagnetic layer is in contact with the fourth magnetic layer and the second magnetic layer,
the third nonmagnetic layer is in contact with the first magnetic pole and the third magnetic layer,
the fourth nonmagnetic layer is in contact with the third magnetic layer and the first magnetic layer, and
the fifth nonmagnetic layer is in contact with the second magnetic layer and the second magnetic pole.

(Technical Proposal 6)
The magnetic recording device according to Technical proposal 4 or 5, wherein
the first nonmagnetic layer includes at least one selected from the group consisting of Cu, Au, Cr, Al, V, and Ag,
the second nonmagnetic layer includes at least one selected from the group consisting of Cu, Au, Cr, Al, V, and Ag,
the third nonmagnetic layer includes at least one selected from the group consisting of Cu, Au, Cr, Al, V, and Ag,
the fourth nonmagnetic layer includes at least one selected from the group consisting of Ru, Ir, Ta, Rh, Pd, Pt, and W, and
the fifth nonmagnetic layer includes at least one selected from the group consisting of Ru, Ir, Ta, Rh, Pd, Pt, and W.

(Technical Proposal 7)
The magnetic recording device according to Technical proposal 4 or 5, wherein
the first nonmagnetic layer includes at least one selected from the group consisting of Ru, Ir, Ta, Rh, Pd, Pt, and W,
the second nonmagnetic layer includes at least one selected from the group consisting of Cu, Au, Cr, Al, V, and Ag,
the third nonmagnetic layer includes at least one selected from the group consisting of Cu, Au, Cr, Al, V, and Ag,
the fourth nonmagnetic layer includes at least one selected from the group consisting of Cu, Au, Cr, Al, V, and Ag, and
the fifth nonmagnetic layer includes at least one selected from the group consisting of Ru, Ir, Ta, Rh, Pd, Pt, and W.

(Technical Proposal 8)
The magnetic recording device according to Technical proposal 4 or 5, wherein
the first nonmagnetic layer includes at least one selected from the group consisting of Ru, Ir, Ta, Rh, Pd, Pt, and W,
the second nonmagnetic layer includes at least one selected from the group consisting of Cu, Au, Cr, Al, V, and Ag,
the third nonmagnetic layer includes at least one selected from the group consisting of Ru, Ir, Ta, Rh, Pd, Pt, and W,
the fourth nonmagnetic layer includes at least one selected from the group consisting of Cu, Au, Cr, Al, V, and Ag, and
the fifth nonmagnetic layer includes at least one selected from the group consisting of Ru, Ir, Ta, Rh, Pd, Pt, and W.

(Technical Proposal 9)
The magnetic recording device according to any one of Technical proposals 1-8, wherein
the first ratio r1 is not less than 0.35 and not more than 0.7.

(Technical Proposal 10)
The magnetic recording device according to any one of Technical proposals 1-9, wherein
the second ratio r2 is not less than 0.45 and not more than 0.56.

(Technical Proposal 11)
The magnetic recording device according to Technical proposal 1, wherein
a product of a first saturation magnetization of the first magnetic layer and a first magnetic layer thickness of the first magnetic layer in the first direction is not less than 9 nmT and not more than 19 nmT, and
a product of a second saturation magnetization of the second magnetic layer and a second magnetic layer thickness of the second magnetic layer in the first direction is not less than 9 nmT and not more than 19 nmT.

(Technical Proposal 12)
The magnetic recording device according to Technical proposal 2 or 3, wherein
a product of a first saturation magnetization of the first magnetic layer and the first magnetic layer thickness is not less than 9 nmT and not more than 19 nmT,
a product of a second saturation magnetization of the second magnetic layer and the second magnetic layer thickness is not less than 9 nmT and not more than 19 nmT,
a product of a third saturation magnetization of the third magnetic layer and the third magnetic layer thickness is not less than 2 nmT and not more than 10 nmT, and
a product of a fourth saturation magnetization of the fourth magnetic layer and the fourth magnetic layer thickness is not less than 2 nmT and not more than 10 nmT.

(Technical Proposal 13)
The magnetic recording device according to any one of Technical proposals 1-12, wherein
the average anisotropic magnetic field Hk is not less than 17,300 Oe and not more than 21,200 Oe, and
the dynamic coercive force Hc0 is not less than 7500 Oe and not more than 11000 Oe.

(Technical Proposal 14)
The magnetic recording device according to any one of Technical proposals 1-13, wherein
the first distance L1 is not less than 15 nm and not more than 50 nm.

(Technical Proposal 15)
The magnetic recording device according to Technical proposal 2 or 3, wherein
the first magnetic layer thickness is not less than 5 nm and not more than 15 nm,
the second magnetic layer thickness is not less than 5 nm and not more than 15 nm,
the third magnetic layer thickness is not less than 1 nm and not more than 5 nm, and
the fourth magnetic layer thickness is not less than 1 nm and not more than 5 nm.

(Technical Proposal 16)
The magnetic recording device according to any one of Technical proposals 1-15, wherein
the magnetic recording medium includes a magnetic recording layer, and a thickness of the magnetic recording layer is not less than 5 nm and not more than 50 nm.

(Technical Proposal 17)

The magnetic recording device according to Technical proposal 16, wherein the magnetic recording layer is a perpendicular magnetization film.

(Technical Proposal 18)

The magnetic recording device according to any one of Technical proposals 1-16, wherein the magnetic head includes a medium facing surface, and an angle between the first direction and the medium facing surface is not less than 0 degrees and not more than 40 degrees.

(Technical Proposal 19)

The magnetic recording device according to any one of Technical proposals 1-18, further comprising:

an element circuit, the element circuit being configured to supply an element current to the magnetic element, the element current having a direction from the first magnetic layer to the second magnetic layer, and when the element current being supplied to the magnetic element, an alternating magnetic field being configured to be generated from the magnetic element.

(Technical Proposal 20)

The magnetic recording device according to any one of Technical proposals 1-19, further comprising:

a recording circuit, the magnetic head further including a coil, the recording circuit being configured to supply a recording current to the coil, and information corresponding to the recording current being recorded on the magnetic recording medium.

According to the embodiment, a magnetic recording device capable of improving recording density can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as magnetic poles and magnetic elements, magnetic layers, nonmagnetic layers, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices practicable by an appropriate design modification by one skilled in the art based on the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
   a magnetic head, including
     a first magnetic pole,
     a second magnetic pole, and
     a magnetic element provided between the first magnetic pole and the second magnetic pole, the magnetic element including a first magnetic layer, and a second magnetic layer provided between the first magnetic layer and the second magnetic pole; and
   a magnetic recording medium,
   the magnetic element including a midpoint between the first magnetic layer and the second magnetic layer in a first direction from the first magnetic pole to the second magnetic pole,
   a first ratio r1 and a second ratio r2 satisfying $$-0.26 \times r1 + 0.60 \leq r2 \leq -0.26 \times r2 + 0.70,$$

the first ratio r1 being a ratio of a second distance L2 between the first magnetic pole and the midpoint in the first direction to a first distance L1 between the first magnetic pole and the second magnetic pole in the first direction, and
   the second ratio r2 being a ratio of a dynamic coercive force Hc0 of the magnetic recording medium to an average anisotropic magnetic field Hk of the magnetic recording medium.

2. The device according to claim 1, wherein
   the magnetic element includes
     a third magnetic layer provided between the first magnetic pole and the first magnetic layer, and
     a fourth magnetic layer provided between the first magnetic layer and the second magnetic layer,
   a first magnetic layer thickness of the first magnetic layer along the first direction is thicker than a third magnetic layer thickness of the third magnetic layer along the first direction, and
   a second magnetic layer thickness of the second magnetic layer along the first direction is thicker than a fourth magnetic layer thickness of the fourth magnetic layer along the first direction.

3. The device according to claim 2, wherein
   the first magnetic layer thickness is thicker than the fourth magnetic layer thickness, and
   the second magnetic layer thickness is thicker than the third magnetic layer thickness.

4. The device according to claim 2, wherein
   the magnetic element includes
     a first nonmagnetic layer provided between the first magnetic layer and the fourth magnetic layer,
     a second nonmagnetic layer provided between the fourth magnetic layer and the second magnetic layer, a third nonmagnetic layer provided between the first magnetic pole and the third magnetic layer,
a fourth nonmagnetic layer provided between the third magnetic layer and the first magnetic layer, and
a fifth nonmagnetic layer provided between the second magnetic layer and the second magnetic pole.

5. The device according to claim 4, wherein
the first nonmagnetic layer is in contact with the first magnetic layer and the fourth magnetic layer,
the second nonmagnetic layer is in contact with the fourth magnetic layer and the second magnetic layer,
the third nonmagnetic layer is in contact with the first magnetic pole and the third magnetic layer,
the fourth nonmagnetic layer is in contact with the third magnetic layer and the first magnetic layer, and
the fifth nonmagnetic layer is in contact with the second magnetic layer and the second magnetic pole.

6. The device according to claim 4, wherein
the first nonmagnetic layer includes at least one selected from the group consisting of Cu, Au, Cr, Al, V, and Ag,
the second nonmagnetic layer includes at least one selected from the group consisting of Cu, Au, Cr, Al, V, and Ag,
the third nonmagnetic layer includes at least one selected from the group consisting of Cu, Au, Cr, Al, V, and Ag,
the fourth nonmagnetic layer includes at least one selected from the group consisting of Ru, Ir, Ta, Rh, Pd, Pt, and W, and
the fifth nonmagnetic layer includes at least one selected from the group consisting of Ru, Ir, Ta, Rh, Pd, Pt, and W.

7. The device according to claim 4, wherein
the first nonmagnetic layer includes at least one selected from the group consisting of Ru, Ir, Ta, Rh, Pd, Pt, and W,
the second nonmagnetic layer includes at least one selected from the group consisting of Cu, Au, Cr, Al, V, and Ag,
the third nonmagnetic layer includes at least one selected from the group consisting of Cu, Au, Cr, Al, V, and Ag,
the fourth nonmagnetic layer includes at least one selected from the group consisting of Cu, Au, Cr, Al, V, and Ag, and
the fifth nonmagnetic layer includes at least one selected from the group consisting of Ru, Ir, Ta, Rh, Pd, Pt, and W.

8. The device according to claim 4, wherein
the first nonmagnetic layer includes at least one selected from the group consisting of Ru, Ir, Ta, Rh, Pd, Pt, and W,
the second nonmagnetic layer includes at least one selected from the group consisting of Cu, Au, Cr, Al, V, and Ag,
the third nonmagnetic layer includes at least one selected from the group consisting of Ru, Ir, Ta, Rh, Pd, Pt, and W,
the fourth nonmagnetic layer includes at least one selected from the group consisting of Cu, Au, Cr, Al, V, and Ag, and
the fifth nonmagnetic layer includes at least one selected from the group consisting of Ru, Ir, Ta, Rh, Pd, Pt, and W.

9. The device according to claim 1, wherein
the first ratio r1 is not less than 0.35 and not more than 0-7.

10. The device according to claim 1, wherein
the second ratio r2 is not less than 0.45 and not more than 0.56.

11. The device according to claim 1, wherein
a product of a first saturation magnetization of the first magnetic layer and a first magnetic layer thickness of the first magnetic layer in the first direction is not less than 9 nmT and not more than 19 nmT, and
a product of a second saturation magnetization of the second magnetic layer and a second magnetic layer thickness of the second magnetic layer in the first direction is not less than 9 nmT and not more than 19 nmT.

12. The device according to claim 2, wherein
a product of a first saturation magnetization of the first magnetic layer and the first magnetic layer thickness is not less than 9 nmT and not more than 19 nmT,
a product of a second saturation magnetization of the second magnetic layer and the second magnetic layer thickness is not less than 9 nmT and not more than 19 nmT,
a product of a third saturation magnetization of the third magnetic layer and the third magnetic layer thickness is not less than 2 nmT and not more than 10 nmT, and
a product of a fourth saturation magnetization of the fourth magnetic layer and the fourth magnetic layer thickness is not less than 2 nmT and not more than 10 nmT.

13. The device according to claim 1, wherein
the average anisotropic magnetic field Hk is not less than 17,300 Oe and not more than 21,200 Oe, and
the dynamic coercive force Hc0 is not less than 7500 Oe and not more than 11000 Oe.

14. The device according to claim 1, wherein
the first distance L1 is not less than 15 nm and not more than 50 nm.

15. The device according to claim 2, wherein
the first magnetic layer thickness is not less than 5 nm and not more than 15 nm,
the second magnetic layer thickness is not less than 5 nm and not more than 15 nm,
the third magnetic layer thickness is not less than 1 nm and not more than 5 nm, and
the fourth magnetic layer thickness is not less than 1 nm and not more than 5 nm.

16. The device according to claim 1, wherein
the magnetic recording medium includes a magnetic recording layer, and
a thickness of the magnetic recording layer is not less than 5 nm and not more than 50 nm.

17. The device according to claim 16, wherein
the magnetic recording layer is a perpendicular magnetization film.

18. The device according to claim 1, wherein
the magnetic head includes a medium facing surface, and
an angle between the first direction and the medium facing surface is not less than 0 degrees and not more than 40 degrees.

19. The device according to claim 1, further comprising:
an element circuit,
the element circuit being configured to supply an element current to the magnetic element, the element current having a direction from the first magnetic layer to the second magnetic layer, and
when the element current is supplied to the magnetic element, an alternating magnetic field is configured to be generated from the magnetic element.

20. The device according to claim 1, further comprising:
a recording circuit,
the magnetic head further including a coil,
the recording circuit being configured to supply a recording current to the coil, and
information corresponding to the recording current being recorded on the magnetic recording medium.

* * * * *